United States Patent
Buehrer et al.

(10) Patent No.: US 6,801,791 B2
(45) Date of Patent: Oct. 5, 2004

(54) CELLULAR COMMUNICATIONS SYSTEM AND RELATED METHODS

(75) Inventors: R. Michael Buehrer, Morristown, NJ (US); Steven Peter Nicoloso, Morristown, NJ (US); Robert Atmaram Soni, Morris Plains, NJ (US); Dirck Uptegrove, Mendham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 589 days.

(21) Appl. No.: 09/810,694

(22) Filed: Mar. 14, 2001

(65) Prior Publication Data

US 2002/0169006 A1 Nov. 14, 2002

(51) Int. Cl.[7] .............................................. H04M 1/00
(52) U.S. Cl. ...................... 455/562.1; 455/91; 455/106; 455/561; 370/295; 370/304
(58) Field of Search ........................... 455/39, 42, 44, 455/17, 13.3, 61, 62, 91, 106, 210, 295, 562.1, 561, 101, 102, 103, 107; 375/354, 295, 304, 267, 343, 347

(56) References Cited

U.S. PATENT DOCUMENTS

| | | | | |
|---|---|---|---|---|
| 5,504,783 A | * | 4/1996 | Tomisato et al. | 375/267 |
| 6,006,110 A | * | 12/1999 | Raleigh | 455/561 |
| 6,031,877 A | * | 2/2000 | Saunders | 375/267 |
| 6,037,898 A | | 3/2000 | Parish et al. | 342/174 |
| 6,507,629 B1 | * | 1/2003 | Hatakeyama | 375/372 |
| 6,615,024 B1 | * | 9/2003 | Boros et al. | 455/67.14 |
| 6,665,348 B1 | * | 12/2003 | Feher | 375/259 |

* cited by examiner

*Primary Examiner*—Cong Van Tran

(57) ABSTRACT

A cellular communications system includes a base station and at least one mobile station communicating therewith. The base station may include a plurality of antennas and a modulator for providing a transmit signal for each antenna. The modulator may estimate a weighting factor for each transmit signal based upon considering each transmit signal as having an unknown and arbitrary fading factor associated therewith and based upon considering the unknown and arbitrary fading factors to have a predetermined cross-correlation function.

27 Claims, 5 Drawing Sheets

CELLULAR COMMUNICATIONS SYSTEM AND RELATED METHODS

FIELD OF THE INVENTION

The present invention relates to the field of telecommunications, and, more particularly, to cellular communications systems.

BACKGROUND OF THE INVENTION

Cellular communications systems typically include multiple base stations for communicating with mobile stations (e.g., a cellular telephone) in various geographical transmission areas. Each base station provides an interface between the mobile station and a telecommunications network which may include land lines, satellites, etc.

Many base stations use an array of antennas, rather than a single antenna, for transmitting signals to the mobile stations. The use of multiple antennas provides enhanced performance in a number of areas, including the ability to direct the transmit signals (i.e., "beam-steering"), enhanced security, and reduction in transmission power, for example. Yet, one problem associated with a multiple antenna transmission is that the transmit signal sent from each of the base station antennas is subject to an unknown fading factor which causes signal degradation. The fading factors are unique to each transmit signal because they are a function of the path of travel of the transmit signal.

To account for the fading factors, cellular systems typically provide some feedback from the mobile station to the base station regarding signal quality. Weighting factors may then be assigned to each of the transmit signals to improve the signal quality based upon this feedback. An example of such a system is disclosed in U.S. Pat. No. 6,037,898 to Parish et al. entitled "Method and Apparatus for Calibrating Radio Frequency Base Stations Using Antenna Arrays." In this system a prescribed signal is transmitted from each antenna element using a transmit apparatus chain associated with the antenna element. The transmitted signal is received by receiver apparatus chains not associated with the antenna. Calibration factors for each antenna element are determined based upon the associated transmit apparatus chain and receiver apparatus chain transfer functions using the prescribed signal and each of the signals received during transmissions.

Such communications systems typically estimate the weighting factors at the mobile station based upon the assumption that there is no spatial fading between the various fading factors. That is, it is assumed that the fading factors are correlated and that the distortion seen along the various paths of travel of the antennas differs only by a simple phase rotation. Of course, this may not always be the case, and the fading factors may indeed be arbitrary with respect to one another. In such instances, this methodology may result in significant signal degradation, which in turn may lead to an increased bit error rate.

SUMMARY OF THE INVENTION

In view of the foregoing background, it is therefore an object of the invention to provide a cellular communications system including a base station with a plurality of antennas that reduces a bit error rate of signal transmission despite the presence of unknown and arbitrary fading factors associated with the signals transmitted from the antennas.

These and other objects, features, and advantages in accordance with the present invention are provided by a cellular communications system including a base station and at least one mobile station communicating therewith. The base station may include a plurality of antennas and a modulator for providing a transmit signal for each antenna. The modulator may estimate a weighting factor for each transmit signal based upon considering each transmit signal as having an unknown and arbitrary fading factor associated therewith and based upon considering the unknown and arbitrary fading factors to have a predetermined cross-correlation function.

More specifically, the modulator may consider the unknown and arbitrary weighting factors to be Gaussian random processes having the predetermined cross-correlation function. Further, a pilot signal may be broadcast on a first one of the plurality of antennas. The modulator may estimate a weighting factor a for the transmit signal broadcast on the first antenna according to the following equation:

$$\alpha = \sqrt{1 - \sum_{i=2}^{M} \omega_i^2},$$

where M is a number of the plurality of antennas and $\omega_i$ are the weighting factors for each of the remaining antennas. Additionally, the modulator may estimate the weighting factors $\omega_i$ for the transmit signals broadcast on each of the antennas except the first antenna according to the following equation:

$$\omega_i = \frac{\frac{\rho_i}{\Gamma}}{\sqrt{M(\rho_i^2/\Gamma^2 + (1 - \rho_i^2 + 1/\Gamma)^2)}},$$

where $\rho_i$ is a magnitude value of the predetermined cross-correlation function and $\Gamma$ is a signal-to-noise ratio of the transmitted signals.

Furthermore, the modulator may estimate the weighting factors by considering a sum of squared absolute values of each weighting factor to be one. Also, the base station may further include a frequency synthesizer for assigning a carrier to the transmit signals. The mobile station may include at least one antenna for receiving the transmit signals and a receiver for demodulating the transmit signals.

A base station for communicating with at least one mobile station in a cellular communications system according to the invention includes a plurality of antennas and a modulator for providing a transmit signal for each antenna. The modulator may estimate a weighting factor for each transmit signal based upon considering each transmit signal as having an unknown and arbitrary fading factor associated therewith and based upon considering the unknown and arbitrary fading factors to have a predetermined cross-correlation function.

A method aspect of the invention is for transmitting communications signals using a cellular communications network and includes providing a transmit signal to each one of a plurality of antennas and estimating a weighting factor for each transmit signal. The estimation may be based upon considering each transmit signal as having an unknown and arbitrary fading factor associated therewith and based upon considering the unknown and arbitrary fading factors to have a predetermined cross-correlation function.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
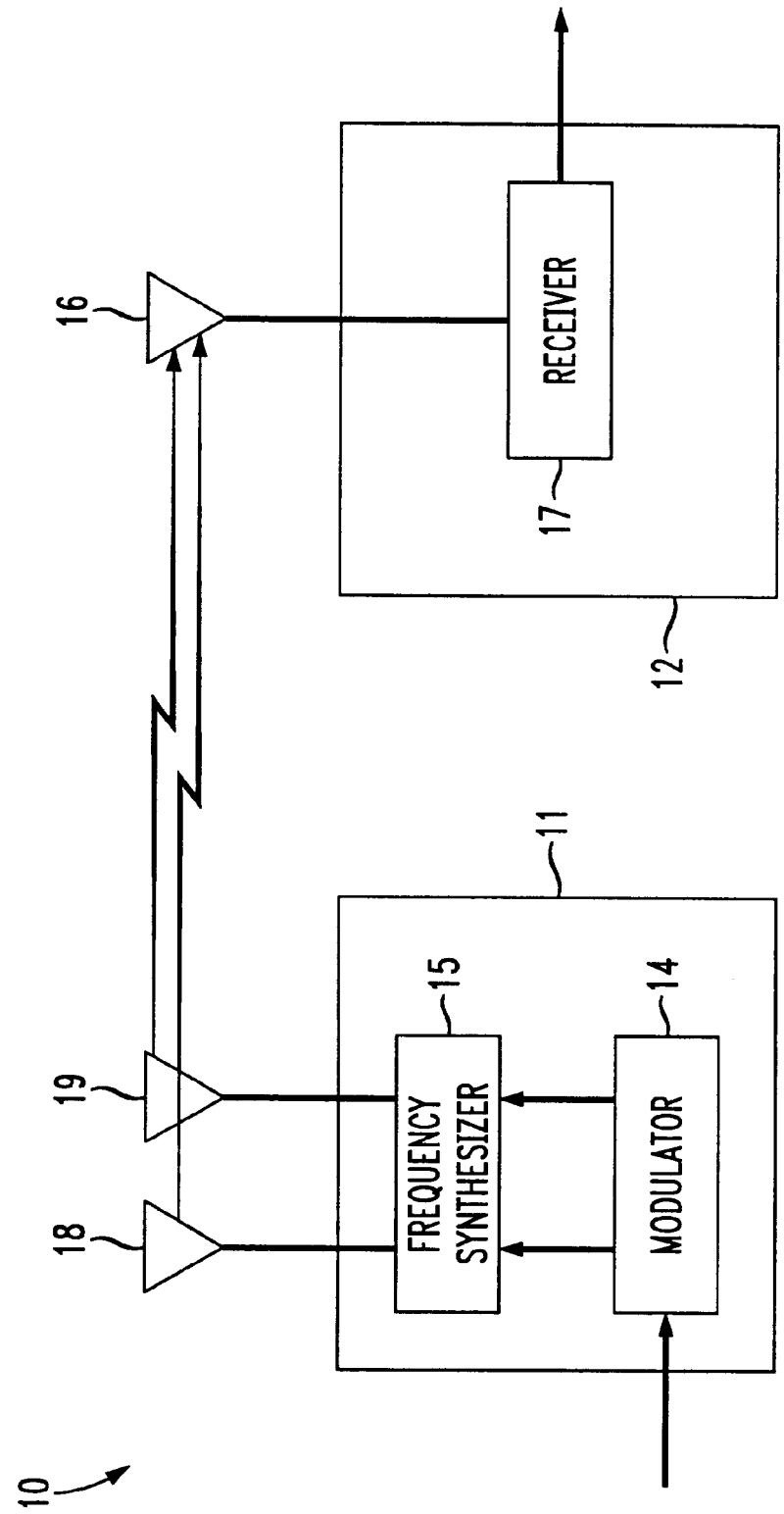
FIG. 1 is a schematic block diagram of a communications system according to the invention.

Referring now to the schematic block diagram of FIG. 1, a cellular communications system 10 according to the invention is now described. The cellular communications system 10 includes a base station 11 and a mobile station 12, such as a cellular telephone, for example, communicating therewith. Although the base station 11 will typically be in communication with multiple mobile stations, the single mobile station 12 is illustrated in FIG. 1 for convenience and ease of illustration. Similarly, the base station 11 and the mobile station 12 are illustratively shown only with transmission and reception circuitry, respectively, since the present invention is particularly directed to transmissions from a base station including multiple antennas. Yet, those of skill in the art will appreciate that the base station 11 may include reception circuitry, and the mobile station 11 may include transmission circuitry as well.

The base station 11 includes two antennas 18 and 19 and a modulator 14 which receives an incoming signal (e.g., an audio signal from a communications network) and provides a transmit signal for each antenna based upon the incoming signal. Of course, the base station 11 may also include additional antennas, as will be appreciated by those of skill in the art. The present invention is particularly well suited for applications in which each transmit signal has an unknown and arbitrary fading factor associated therewith based upon a respective path of travel to the mobile station 12, as described above. The modulator 11 estimates a weighting factor for each of the transmit signals for reducing a bit error rate of the transmit signals, as will be described further below. The modulator 11 then assigns each estimated weighting factor to its respective transmit signal.

The base station 11 also includes a frequency synthesizer 15 for assigning a carrier to the transmit signals. The mobile station 12 includes an antenna 16 for receiving the transmit signals and a receiver 17 for demodulating the transmit signals. Of course, multiple antennas may be used at the mobile station 12, though the single antenna 16 is illustrated in FIG. 1 for convenience.

The signal received at the mobile station 12 from a base station having two antennas, for example, may in general be modeled as:

$$r(t)=(\alpha\gamma_1+\omega\gamma_2)\times(t)+n(t), \quad (1)$$

where $\alpha$ and $\omega$ are the weighing factors applied to the transmit signals of antennas 18 and 19, respectively, $\gamma_1$ and $\gamma_2$ are the fading factors associated with the transmit signals as they travel from antennas 18 and 19 to the mobile station 12, x(t) is the transmitted data signal which is a function of the data symbols b(t), and n(t) is thermal noise present at the receiver 17. At the base station 11, it will be assumed herein that a common broadcast pilot signal is transmitted to all mobile stations for use as a coherent reference, as will be appreciated by those of skill in the art. As it is common to all of the mobile stations, the pilot signal generally cannot be transmitted on multiple antennas, i.e., it cannot be steered. Thus, ignoring the estimation error, the mobile station 12 will estimate the fading channel according to prior art methods as:

$$\hat{\gamma}=\gamma_1. \quad (2)$$

Since the mobile station 12 uses the pilot signal as a coherent reference, the weighting factors are determined in the following manner according to the prior art. A decision statistic is obtained by multiplying the signal received by the mobile station 12 by $\hat{\gamma}^*$. After sampling (and de-spreading, if necessary) this received signal, the decision statistic can be modeled as:

$$z_b=\gamma_1^*(\alpha\gamma_1+\omega\gamma_2)b+n. \quad (3)$$

In the absence of spatial fading, $\gamma_2=e^{j\theta}\gamma_1$. That is, the distortion seen along the paths from antennas 18 and 19 are assumed to differ only by a simple phase rotation. Thus, the decision statistic becomes:

$$z_b=(\alpha|\gamma_1|^2+\omega e^{j\theta}|\gamma_1|^2)b+n. \quad (4)$$

Typically, the data symbol b carries information in its phase. Thus, it is desirable for the multiplicative distortion factor $(\alpha|\gamma_1|^2+\omega e^{j\theta}|\gamma_1|^2)$ to be real. To accomplish this, $\alpha$ and $\omega$ are set such that $$\alpha = \frac{1}{\sqrt{2}} \text{ and } \omega = \frac{1}{\sqrt{2}}e^{-j\theta}$$

with normalization to maintain unity transmit power. This is an example of beam-steering.

A problem with the above prior art method occurs when $\gamma_2 \neq e^{j\theta}\gamma_1$. As noted above, $\gamma_2$ can be arbitrary and not related to $\gamma_1$ at all. In such a case the decision statistic will not be completely real and the performance will degrade significantly. For example, in the case where $\gamma_2$ and $\gamma_1$ are uncorrelated, it is possible for $(\alpha|\gamma_1|^2+\omega e^{j\theta}|\gamma_1|^2)<0$, and the receiver 17 may have about a 50% bit error rate.

According to the present invention, the weighting factors $\alpha$ and $\omega$ are estimated such that the probability of error for arbitrary $\gamma_1$ and $\gamma_2$ are minimized. That is, the present invention is concerned with the probability distribution of:

$$\gamma=(\alpha|\gamma_1|^2+\omega|\gamma_1^*\gamma_2|). \quad (5)$$

Specifically, the present invention allows for estimation of the weighting factors $\alpha$ and $\omega$ such that the probability of bit error rate is minimized without knowing $\gamma_1$ and $\gamma_2$ a priori. To do so, the modulator 11 estimates a weighting factor for each transmit signal based upon considering each transmit signal as having an unknown and arbitrary fading factor associated therewith. Further, the modulator also considers the unknown and arbitrary fading factors to have a predetermined cross-correlation function. For example, the modulator may consider the unknown and arbitrary fading factors to be Gaussian random processes having the predetermined cross-correlation function, which may be given by the equation:

$$E\{\gamma_i \gamma_1^*\} = \rho_i e^{j\Theta_i}, \quad (6)$$

where $\gamma_1$ is the fading factor for the transmit signal associated with the pilot signal antenna, $\gamma_i$ are the fading factors for each of the remaining transmit signals (for a number of M antennas), and $\rho_i$ and $\theta_i$ are magnitude and phase components of the predetermined cross-correlation function, respectively.

Thus, a weighting factor $\alpha$ for the transmit signal to be broadcast on the pilot signal antenna (i.e., the antenna 18) may be determined according to the following equation:

$$\alpha = \sqrt{1 - \sum_{i=2}^{M} \omega_i^2}, \quad (7)$$

where $\omega_i$ are the weighting factors for each of the remaining antennas. Equation (7) is obtained by assuming $\alpha$ to be a real number (a logical assumption for typical cellular communications systems, as will be appreciated by those of skill in the art) and by considering a sum of squared absolute values of each weighting factor to be one $$\left(\text{i.e., } \alpha^2 + \sum_{i=2}^{M} |\omega_i|^2 = 1\right).$$

It follows that the weighting factors $\omega_i$ for the transmit signals broadcast on each of the remaining antennas may be determined according to the following equation:

$$\omega_i = \frac{\frac{\rho_i}{\Gamma}}{\sqrt{M(\rho_i^2/\Gamma^2 + (1 - \rho_i^2 + 1/\Gamma)^2)}}, \quad (8)$$

where the complex value $\omega = \omega e^{-\eta}$ is substituted ($\eta = -\theta$) and $\Gamma$ is a signal-to-noise ratio of the transmitted signals.

Estimation of the weighting factors according to the present invention provides several benefits over the conventional prior art weighting described above. First, the weighting factors according to the invention provide a reduced bit error rate regardless of the amount of angular spread in the environment (which is directly related to the amount of correlation between $\gamma_1$ and $\gamma_i$). Secondly, the weighting factors of the present invention ensure that beam-steering does not significantly diminish performance with respect to a single antenna. That is, the performance does not degrade to the point where it is worse than transmitting from a single antenna.

To illustrate these advantages more clearly, an example is provided below for a base station including two antennas, as illustrated in FIG. 1. The example compares the results provided by conventional weighting factors according to the prior art and weighting factors estimated according to the present invention.

EXAMPLE

Using equations (7) and (8) above, it follows that the weighting factors $\alpha$ and $\omega$ corresponding to antennas 18 and 19, respectively, are as follows:

$$\alpha = \frac{1 - \rho^2 + \frac{1}{\Gamma}}{\sqrt{\rho^2/\Gamma^2 + (1 - \rho^2 + 1/\Gamma)^2}}, \quad (9)$$

and $$\omega = \frac{\frac{\rho}{\Gamma}}{\sqrt{\rho^2/\Gamma^2 + (1 - \rho^2 + 1/\Gamma)^2}}. \quad (10)$$

Figure 2:
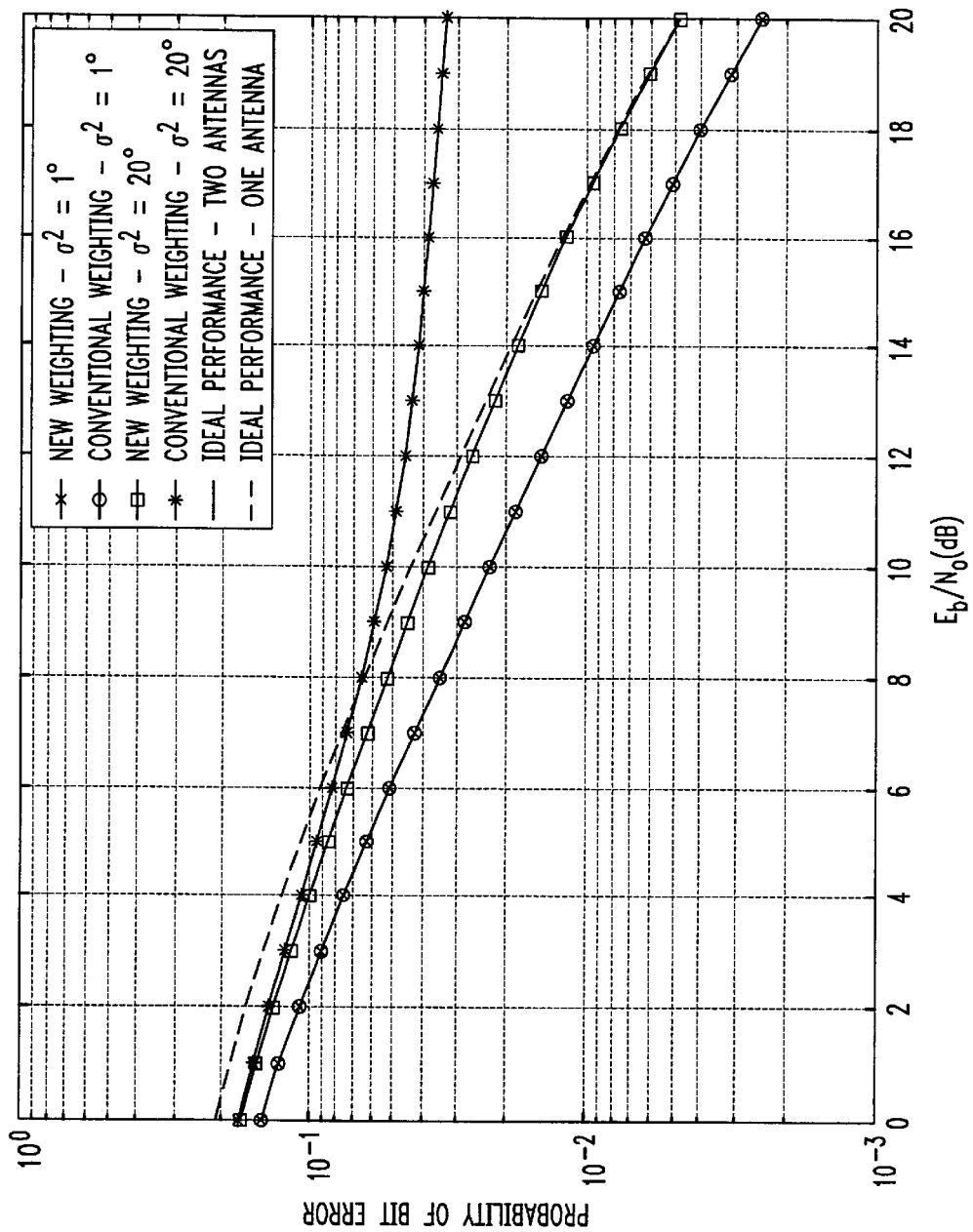
FIG. 2 is a graph illustrating a probability of bit error rate versus energy per bit divided by noise power spectral density for transmit signals with conventional weighting factors according to the prior art and with weighting factors estimated according to the invention.

The performance of the weighting factors according to the present invention is illustrated along with the performance of conventional weighting factors for narrow ($\sigma^2=1°$) and wide ($\sigma^2=20°$) angle spread environments in the graph of FIG. 2. For ease of comparison, the ideal performance of a single antenna and two steered antennas corresponding to each of these angle spreads are also illustrated. For the present example, binary phase shift keying (BPSK) modulation is assumed in typical flat Rayleigh fading, though other types of modulation may also be used in accordance with the present invention, as will be understood by those of skill in the art.

It may be seen that in the narrow angle spread environments (e.g., $\sigma^2=1°$ corresponding to $\rho \approx 1$), the conventional approach and the above approach according to the invention provide substantially equal results to the ideal two element beam steering. However, as the angular distribution becomes larger ($\sigma^2=20°$), the correlation between the two channels goes down ($\sigma=0.77$) and the performance of the conventional weighting degrades significantly. In fact, the performance degrades beyond the performance of a single antenna. In other words, in such situations, it would have been better to simply use a single antenna rather than attempting beam-steering using the conventional weighting factor estimation.

Figure 3:
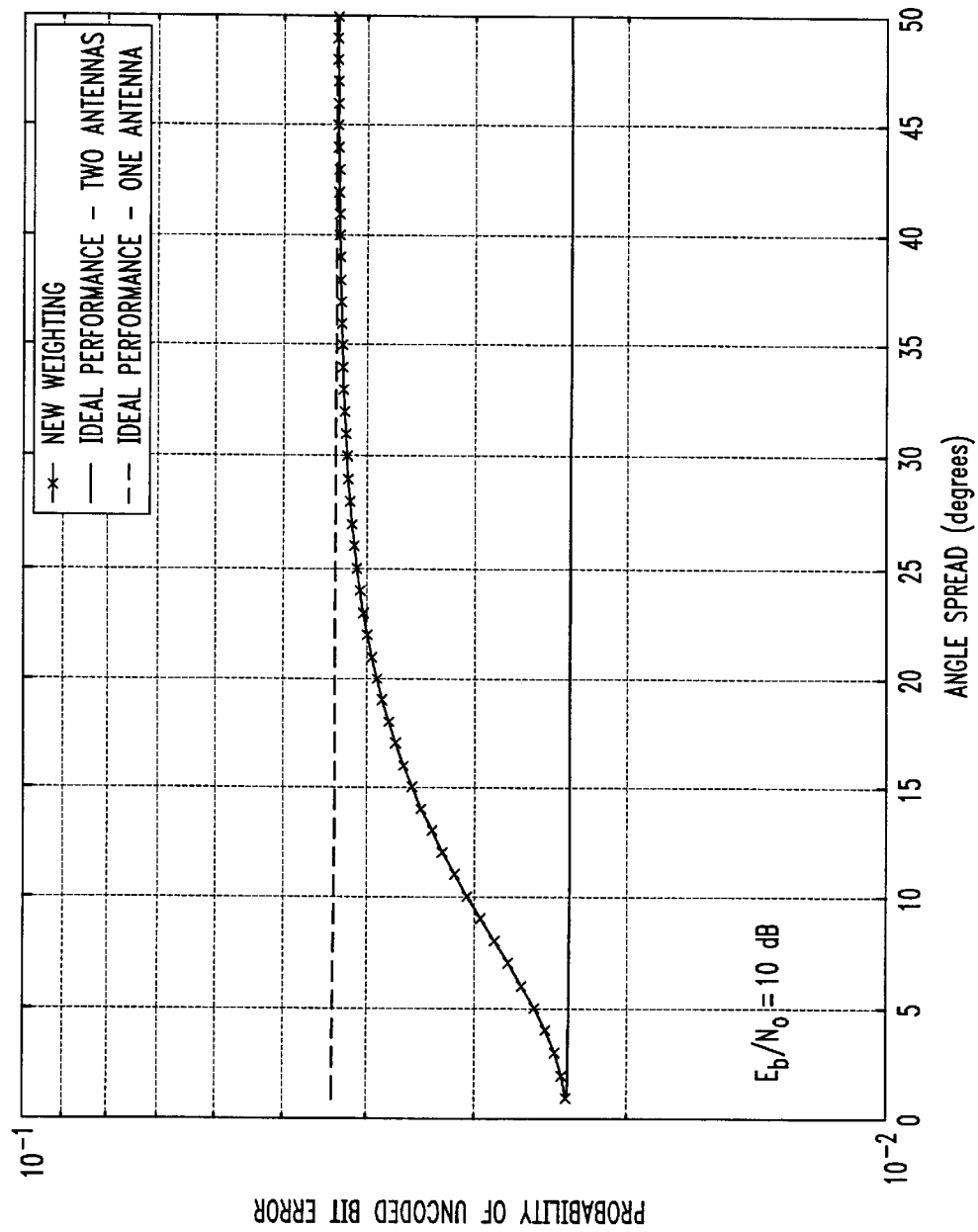
FIG. 3 is graph illustrating a probability of unencoded bit error versus angle spread for transmit signals with weighting factors estimated according to the invention.

In contrast to the conventional approach, the weighting according to the invention does result in performance degradation from ideal two antenna performance (which is unavoidable in an open-loop configuration) but always provides better performance than a single antenna. As may be seen, this performance is significantly better than that of the conventional weighting method according to the prior art. Degradation according to the weighting of the invention as the angle spread increases is illustrated in FIG. 3. Again, it may be seen that degradation is gradual and there is no performance degradation beyond that of a single transmit antenna.

Figure 4:
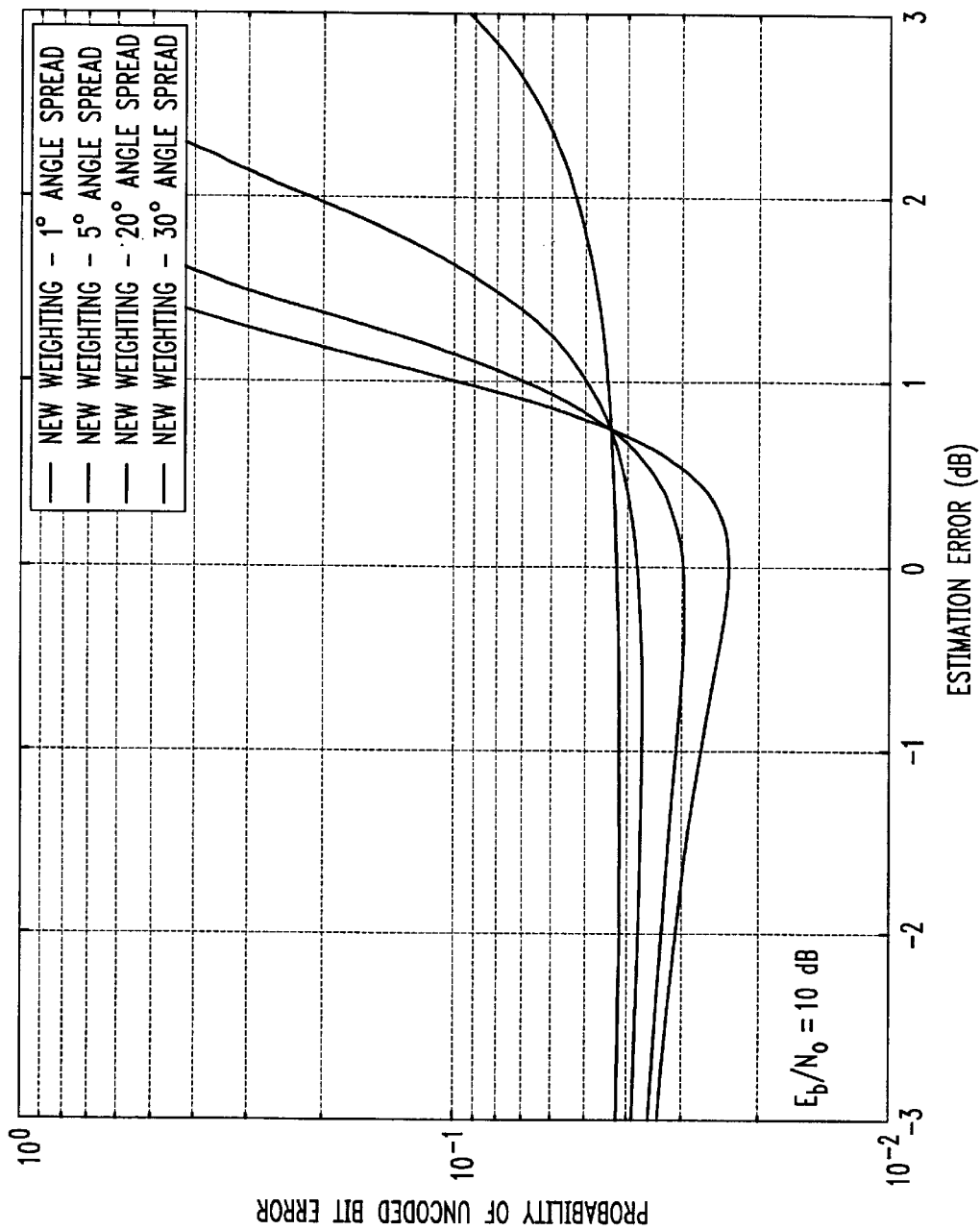
FIG. 4 is a graph illustrating a probability of unencoded bit error versus a correlation estimation error for transmit signals having weighting factors estimated according to the invention.
Figure 5:
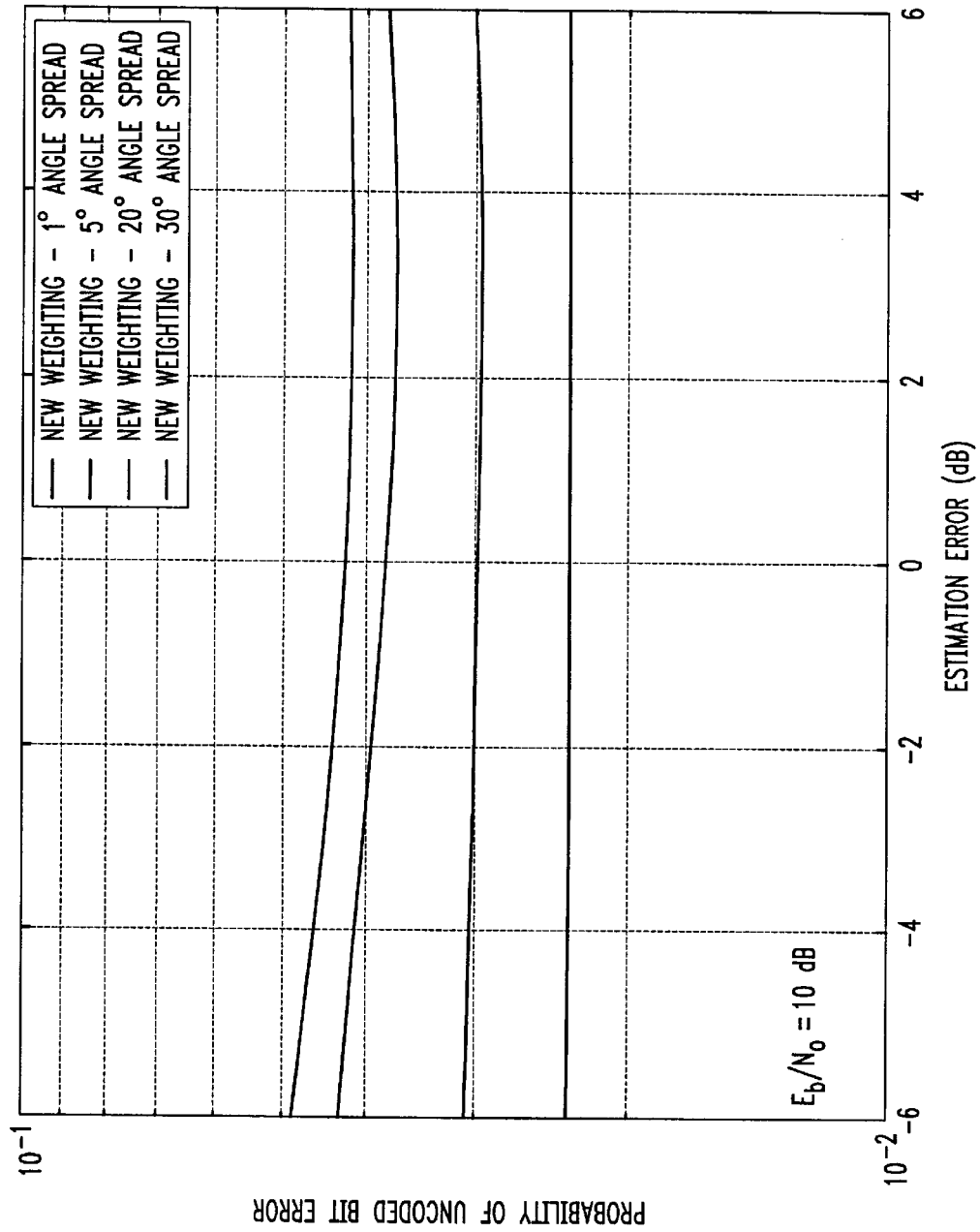
FIG. 5 is a graph illustrating a probability of unencoded bit error versus an estimated signal-to-noise ratio for transmit signals having weighting factors estimated according to the present invention.

It will be appreciated by those of skill in the art that determination of the weighting factors according to the present invention requires certain estimations to be performed. That is, since $\Gamma$ and $\rho$ are not known a priori, these values must be estimated. Referring to FIGS. 4 and 5, the performance of the weighting factors estimated according to the invention versus estimated errors of $\rho$ and $\Gamma$ are respectively illustrated. It can be seen that the dependence on $\Gamma$ is very minimal. In fact, since estimation of $\sigma$ is not trivial, it would be useful to take advantage of this minimal dependence and simply use a constant expected value for $\sigma$ based on the required performance, rather than estimating $\sigma$.

Even so, it will be appreciated that the sensitivity of the weighting factors to correlation estimation (which is required according to the prior art) is greater than the sensitivity to $\sigma$ estimation (which is required according to the invention). At any rate, the influence of $\sigma$ may need to be taken into account in some situations. The estimation of $\sigma$ may be done at the mobile station and reported to the base station, or it may be estimated on the uplink at the base station (assuming reciprocity in the long term statistics), as will be appreciated by those of skill in the art.

In some systems, multiple pilot signals may be sent from the same number of antennas. For example, in one mode of the code division multiple access (CDMA) 2000 standard, a common pilot is transmitted from a first antenna and a second diversity pilot is transmitted from a second antenna. The present invention may be used to estimate the weighting factors for a four element transmit system accommodating this standard, for example, such that antennas three and four are associated with antennas one and two, respectively. The weighting factors for antennas one and two would be determined as outlined in equations (9) and (10), above, ignoring antennas three and four. The weighting factors for antennas three and four would also be determined from equations (9) and (10), this time ignoring antennas one and two. Those skilled in the art will also appreciate that the two solutions for antennas one and two and for antennas three and four could be averaged to provide a single solution which applies to both pairs of antennas. This approach may be applicable where the relationship between the pairs of antennas is the same.

Of course, as indicated above, the present invention may also be used where there is a single pilot but more than two base station antennas. The weighting factors would then be determined according to equations (7) and (8), above.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A cellular communications system comprising:
a base station and at least one mobile station communicating therewith, said base station comprising
a plurality of antennas, and
a modulator for providing a transmit signal for each antenna, said modulator estimating a weighting factor for each transmit signal based upon considering each transmit signal as having an unknown and arbitrary fading factor associated therewith, and based upon considering the unknown and arbitrary fading factors to have a predetermined cross-correlation function.

2. The cellular communications system of claim 1 wherein said modulator estimates each weighting factor by considering the unknown and arbitrary fading factors to be Gaussian random processes having the predetermined cross-correlation function.

3. The cellular communications system of claim 2 wherein a pilot signal is broadcast on a first one of said plurality of antennas.

4. The cellular communications system of claim 3 wherein said modulator estimates a weighting factor α for the transmit signal broadcast on said first antenna according to the following equation:

$$\alpha = \sqrt{1 - \sum_{i=2}^{M} \omega_i^2},$$

where M is a number of said plurality of antennas and $\omega_i$ are the weighting factors for each of said remaining antennas.

5. The cellular communications system of claim 3 wherein said modulator estimates weighting factors $\omega_i$ for the transmit signals broadcast on each of said antennas except said first antenna according to the following equation:

$$\alpha = \sqrt{1 - \sum_{i=2}^{M} \omega_i^2},$$

where M is a number of said plurality of antennas, $\rho_i$ is a magnitude value of the predetermined cross-correlation function, and Γ is a signal-to-noise ratio of the transmit signals.

6. The cellular communications system of claim 1 wherein said modulator estimates the weighting factors by considering a sum of squared absolute values of each weighting factor to be one.

7. The cellular communications system of claim 1 wherein said base station further comprises a frequency synthesizer for assigning a carrier to the transmit signals.

8. The cellular communications system of claim 1 wherein said mobile station comprises:
at least one antenna for receiving the transmit signals; and
a receiver for demodulating the transmit signals.

9. A cellular communications system comprising:
a base station and at least one mobile station communicating therewith, said base station comprising
a plurality of antennas, and
a modulator for providing a transmit signal for each antenna, said modulator estimating a weighting factor for each transmit signal based upon considering each transmit signal as having an unknown and arbitrary fading factor associated therewith, and based upon considering the unknown and arbitrary fading factors to be Gaussian random processes having a predetermined cross-correlation function; and said mobile station comprising
at least one antenna for receiving the plurality of transmit signals, and
a receiver for demodulating the plurality of transmit signals.

10. The cellular communications system of claim 9 wherein a pilot signal is broadcast on a first one of said plurality of antennas.

11. The cellular communications system of claim 10 wherein said modulator estimates a weighting factor α for the transmit signal broadcast on said first antenna according to the following equation:

$$\alpha = \sqrt{1 - \sum_{i=2}^{M} \omega_i^2},$$

where M is a number of said plurality of antennas and $\omega_i$ are the weighting factors for each of said remaining antennas.

12. The cellular communications system of claim 10 wherein said modulator estimates weighting factors $\omega_i$ for the transmit signals broadcast on each of said antennas except said first antenna according to the following equation:

$$\omega_i = \frac{\frac{\rho_i}{\Gamma}}{\sqrt{M(\rho_i^2/\Gamma^2 + (1-\rho_i^2 + 1/\Gamma)^2)}},$$

where M is a number of said plurality of antennas, $\rho_i$ is a magnitude value of the predetermined cross-correlation function, and $\Gamma$ is a signal-to-noise ratio of the transmitted signals.

13. The cellular communications system of claim 9 wherein said modulator estimates the weighting factors by considering a sum of squared absolute values of each weighting factor to be one.

14. The cellular communications system of claim 9 wherein said base station further comprises a frequency synthesizer for assigning a carrier to the transmit signals.

15. A base station for communicating with at least one mobile station in a cellular communications system, the base station comprising
a plurality of antennas; and
a modulator for providing a transmit signal for each antenna, said modulator estimating a weighting factor for each transmit signal based upon considering each transmit signal as having an unknown and arbitrary fading factor associated therewith, and based upon considering the unknown and arbitrary fading factors to have a predetermined cross-correlation function.

16. The base station of claim 15 wherein said modulator estimates each weighting factor by considering the unknown and arbitrary fading factors to be Gaussian random processes having the predetermined cross-correlation function.

17. The base station of claim 16 wherein a pilot signal is broadcast on a first one of said plurality of antennas.

18. The base station of claim 17 wherein said modulator estimates a weighting factor $\alpha$ for the transmit signal broadcast on said first antenna according to the following equation:

$$\alpha = \sqrt{1 - \sum_{i=2}^{M} \omega_i^2},$$

where M is a number of said plurality of antennas and $\omega_i$ are the weighting factors for each of said remaining antennas.

19. The base station of claim 17 wherein said modulator estimates weighting factors $\omega_i$ for the transmit signals broadcast on each of said antennas except said first antenna according to the following equation:

$$\omega_i = \frac{\frac{\rho_i}{\Gamma}}{\sqrt{M(\rho_i^2/\Gamma^2 + (1-\rho_i^2 + 1/\Gamma)^2)}},$$

where M is a number of said plurality of antennas, $\rho_i$ is a magnitude value of the predetermined cross-correlation function, and $\Gamma$ is a signal-to-noise ratio of the transmit signals.

20. The base station of claim 15 wherein said modulator estimates the weighting factors by considering a sum of squared absolute values of each weighting factor to be one.

21. The base station of claim 15 wherein said base station further comprises a frequency synthesizer for assigning a carrier to the transmit signals.

22. A method for transmitting communications signals using a cellular communications network comprising:
providing a transmit signal to each one of a plurality of antennas;
estimating a weighting factor for each transmit signal based upon considering each transmit signal as having an unknown and arbitrary fading factor associated therewith and based upon considering the unknown and arbitrary fading factors to have a predetermined cross-correlation function.

23. The method of claim 22 wherein estimating comprises considering the unknown and arbitrary fading factors to be Gaussian random processes having the predetermined cross-correlation function.

24. The method of claim 23 further comprising broadcasting a pilot signal on a first one of the plurality of antennas.

25. The method of claim 24 wherein estimating comprises estimating a weighting factor $\alpha$ for the transmit signal broadcast on the first antenna according to the following equation:

$$\omega_i = \frac{\frac{\rho_i}{\Gamma}}{\sqrt{M(\rho_i^2/\Gamma^2 + (1-\rho_i^2 + 1/\Gamma)^2)}},$$

where M is a number of the plurality of antennas and $\omega_i$ are the weighting factors for each of the remaining antennas.

26. The method of claim 24 wherein estimating comprises estimating weighting factors $\omega_i$ for the transmit signals broadcast on each of the antennas except the first antenna according to the following equation:

$$\omega_i = \frac{\frac{\rho_i}{\Gamma}}{\sqrt{M(\rho_i^2/\Gamma^2 + (1-\rho_i^2 + 1/\Gamma)^2)}},$$

where M is a number of the plurality of antennas, $\rho_i$ is a magnitude value of the predetermined cross-correlation function, and $\Gamma$ is a signal-to-noise ratio of the transmitted signals.

27. The method of claim 22 wherein estimating comprises estimating the weighting factors by considering a sum of squared absolute values of each weighting factor to be one.

* * * * *